Nov. 28, 1933.  F. C. WERNER ET AL  1,936,893
COOKIE MACHINE
Filed April 27, 1931    4 Sheets-Sheet 1
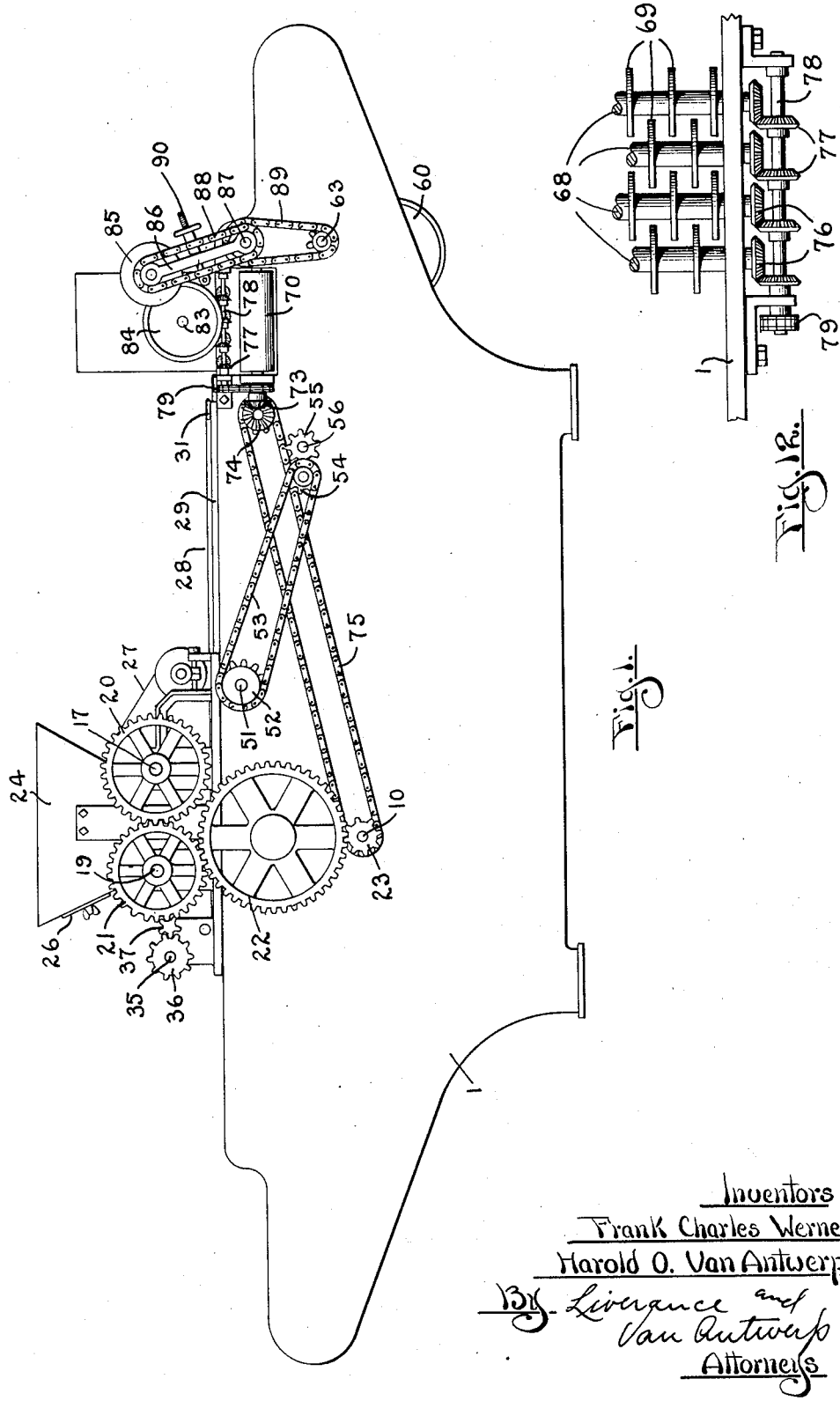
Inventors
Frank Charles Werner
Harold O. Van Antwerp
By Liverance and Van Antwerp
Attorneys

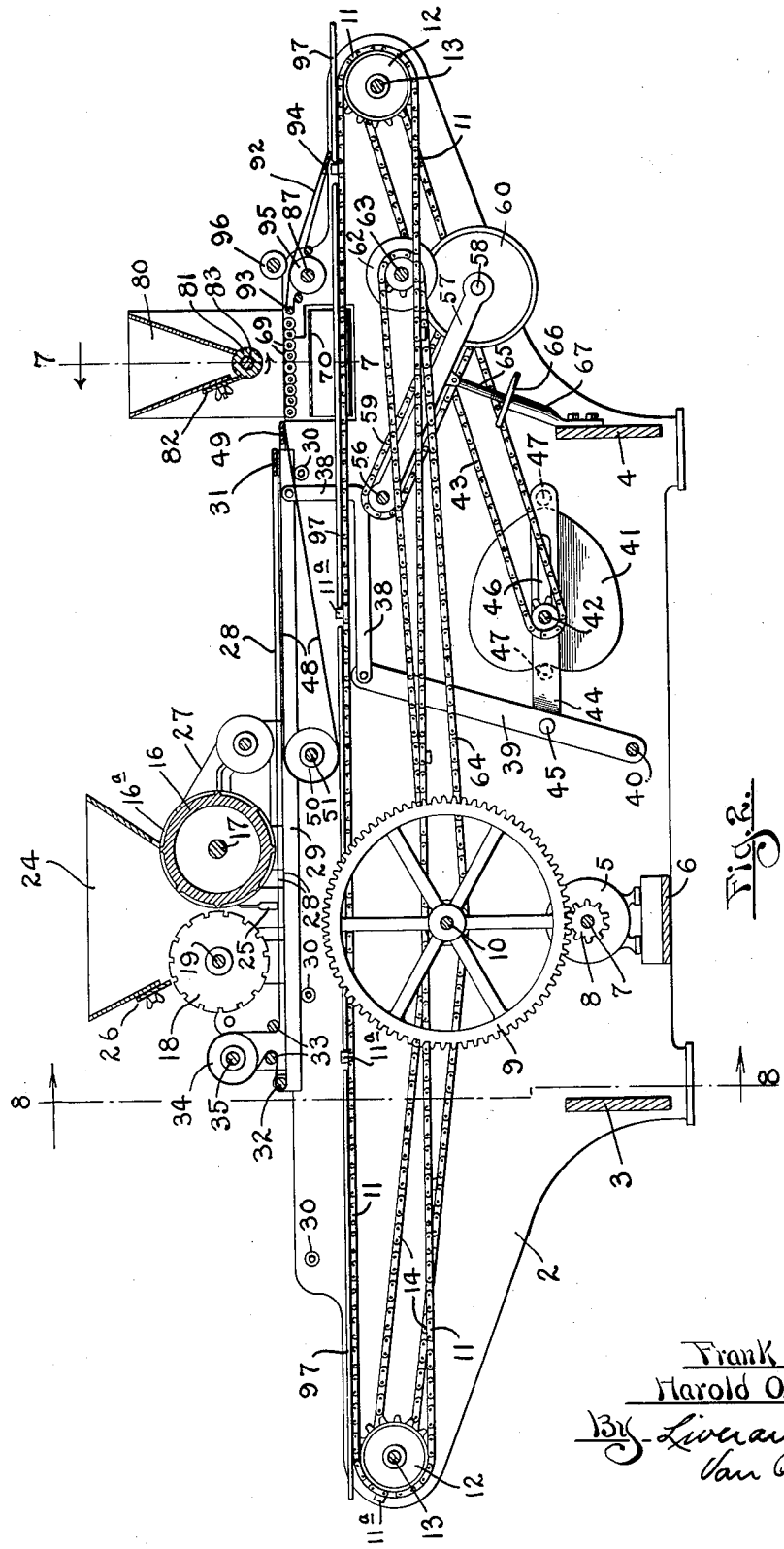

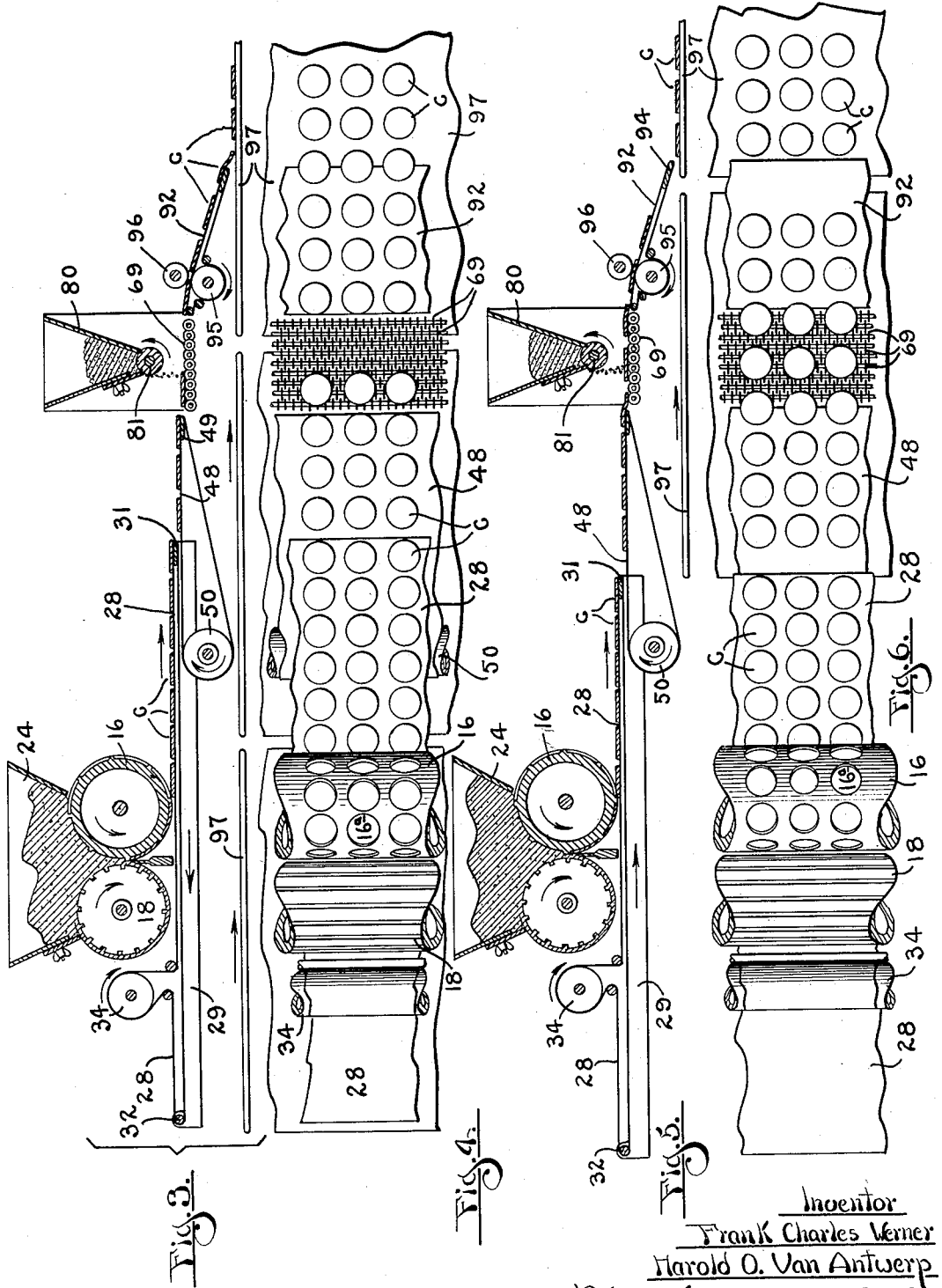

Nov. 28, 1933. F. C. WERNER ET AL 1,936,893
COOKIE MACHINE
Filed April 27, 1931 4 Sheets-Sheet 4

Inventors
Frank Charles Werner
Harold O. Van Antwerp
By Liverance and
Van Antwerp
Attorneys Patented Nov. 28, 1933

1,936,893

UNITED STATES PATENT OFFICE 1,936,893

COOKIE MACHINE

Frank Charles Werner, Grand Rapids, and Harold O. Van Antwerp, East Grand Rapids, Mich.; said Van Antwerp assignor to said Werner Application April 27, 1931. Serial No. 533,017

4 Claims. (Cl. 107—7)

This invention relates to cookie machinery and more particularly to automatic machines for forming the dough and depositing the dough in proper spaced relation on the pans on which it is to be baked.

In machines of this nature it is customary to form the dough in dies or depressions in the periphery of a rotating drum from which the dough, properly shaped for baking, is deposited upon a conveyor and from the conveyor the shaped dough is deposited on pans which are passed through the machine to receive it. It is customary to arrange the depressions or dies in the roller in closely spaced uniform relation but the relationship of the cookies on the pans must be considerably altered both relative to distance and to arrangement and the principal object of this invention is to provide means which will receive the cookie dough deposited in a certain close uniform arrangement from the die drum or roller and to deposit said cookie dough upon the baking pans in a different spacing and arrangement and also to provide means by which said spacing and arrangement may readily be varied.

For example, the cookies customarily are formed in the drum and deposited therefrom in closely and equally spaced relation. However, the baking pans which customarily pass through the machine on a conveyor are arranged with gaps between them, which is almost necessary in operation of the machine, and also it is desired to spread the cookies apart farther on the pans than they were arranged originally in the die roller. For some kinds of cookies it is desirable to have them arranged quite closely together and for others they should be spaced more widely apart for reasons well understood by bakers and this invention provides means for separating the cookies deposited by the die roller into groups with gaps between said groups whereby a group of cookies may be deposited upon each pan and the gaps between each group will accommodate the gaps between pans. The invention furthermore, provides means for quickly and readily changing the relationship of the respective cookies in the groups and also changing the distances between groups whereby the cookies may be properly deposited upon the pans wholly within the boundary thereof without overlapping the edges and the distances between cookies may be varied as required by the character of the dough or shape and size of the cookie.

The machine also provides novel means for so-called "sugaring" the cookies or depositing material such as sugar, flour, nuts, etc., on a surface thereof and for pressing such coating into the surface if desired. For example, it may be desired to provide nuts on the surface of a cookie and to press them into said surface so that they may be substantially flush with the result that the said surface will be relatively smooth and even which is desirable in packing cookies. A cookie with a rough uneven surface does not pack and ship as well as one which has a smooth regular surface and therefore cookies of substantially uniform thickness are more desirable from a packing and shipping standpoint.

The invention provides various other new and useful features of construction and arrangement as will hereinafter be more fully described and particularly pointed out in the claims, reference being had to the accompanying drawings, in which, Fig. 1 is a side elevation of a machine embodying this invention.

Fig. 2 is a longitudinal sectional elevation of the same.

Fig. 3 is a fragmentary sectional elevation of the essential working parts of the invention shown in the nature of a diagram.

Fig. 4 is a fragmentary plan view of the essential parts shown in Fig. 3.

Fig. 5 is the same as Fig. 3 with the parts moved to an advanced position of operation.

Fig. 6 is a fragmentary plan view of the essential parts shown in Fig. 5.

Fig. 12 is a fragmentary view of the sugaring roller conveyor showing the driving mechanism thereof.

Like reference numbers refer to like parts in all of the figures.

Figure 7:
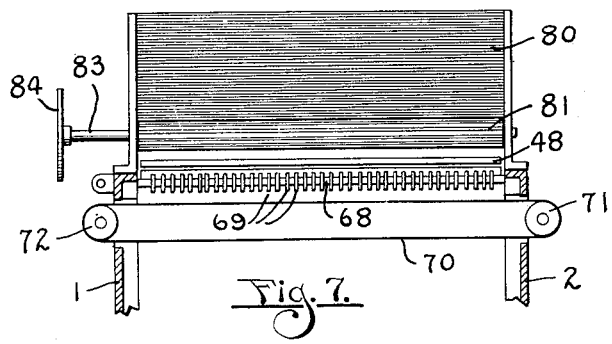
Fig. 7 is a transverse sectional elevation on the line 7—7 of Fig. 2, with parts omitted, illustrating the sugaring mechanism.
Figure 9:
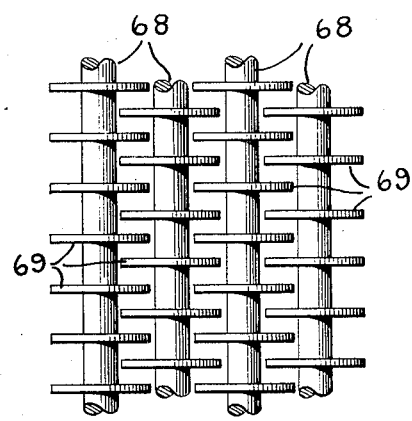
Fig. 9 is a fragmentary top view of the conveyor disks of the sugaring device.
Figure 8:
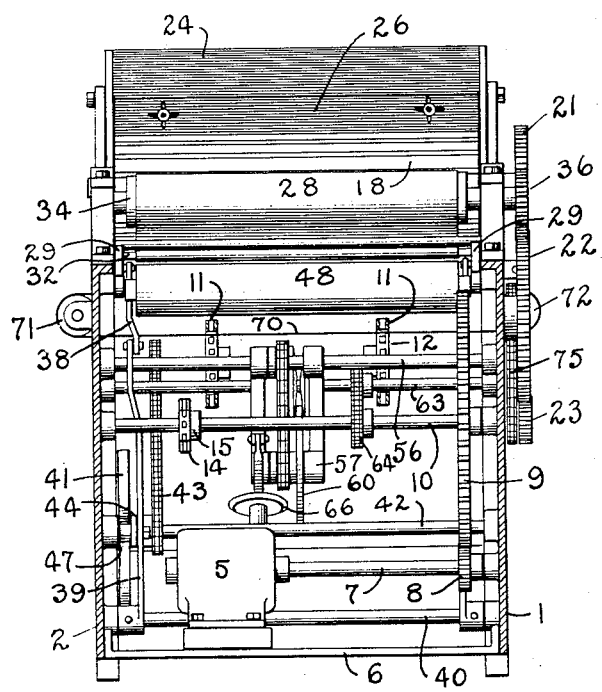
Fig. 8 is a transverse sectional elevation of the machine on the line 8—8 of Fig. 2.
Figure 10:
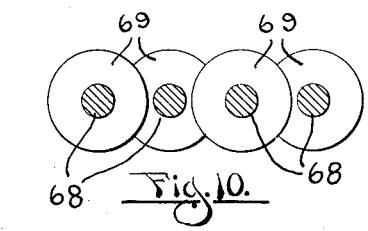
Fig. 10 is an end elevation of the parts shown in Fig. 9.
Figure 11:
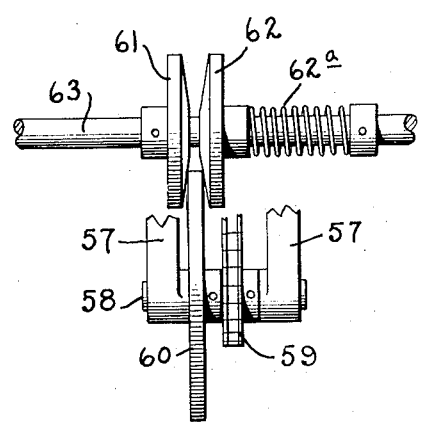
Fig. 11 is a fragmentary elevation of the variable speed driving mechanism forming a part of the machine.

The machine has side frame members 1 and 2 which are joined by cross frame members 3 and 4. A motor 5, mounted on a beam 6, has a shaft 7 on which a pinion 8 is fixed, said pinion 8 meshing with a main drive gear 9 fixed to a shaft 10 journaled on the frame.

A pan conveyor is provided comprising two spaced apart endless chains 11 passing over sprockets 12 located at the respective ends of the machine and mounted on conveyor shafts 13 extending transversely of the frame at the respective ends of the machine and journaled in said frame. A conveyor drive chain 14 passes over a sprocket 15 on the shaft 10 and over a similar sprocket (not shown) on the conveyor shaft 13 at the entry end of the machine and thereby drives said conveyor from said shaft 10.

A die roller 16 is mounted above the frame members 1 and 2, extending transversely of the frame and having a shaft 17 journaled in upward extensions of the frame. A presser roller 18 is located with its periphery closely adjacent that of the die roller 16 and has its shaft 19 also journaled in upward extensions of the frame. The shafts 17 and 19 are provided respectively with gears 20 and 21 which intermesh thereby causing the die roller and presser roller to rotate simultaneously. The gear 21 meshes with an idler gear 22 mounted on the frame member 1 and said gear 22 is driven by a pinion 23 which is mounted on the outer end of the main drive shaft 10. A hopper 24 is arranged in position to supply dough to the die roller 16 and other conventional and well known parts of a cookie forming device are provided such as the scraper blade 25 which removes surplus dough from the die roller 16, the adjustable gate 26 which prevents leakage of the dough out of the hopper around the presser roller, the delivery wires 27 which remove the formed dough from the die recess as the die roller rotates, etc.

The cookie forming apparatus above described is conventional and well known and the die recesses 16a on the periphery of the die roller are closely spaced as is usual.

Although not strictly accurate because the actual cookie does not exist until after it has been baked, for simplification the formed dough will be hereafter termed a "cookie" and, because of the fact that this machine deals with nothing excepting the unbaked dough, the term cookie whenever mentioned hereinafter will refer to the dough formed into shape to make a cookie, such "cookies" being indicated by C.

An endless receiving belt 28 extends in a horizontal plane beneath the die roller 16. The mounting of the belt 28 involves a reciprocable frame 29 supported on the main frame of the machine by rollers 30 and having a shoe 31 at the delivery end and a roller 32 at its opposite end. The belt 28 passes over said roller and said shoe of said frame 29 and also over guide rollers 33 and a driving roller 34, said guide rollers 33 and driving roller 34 being mounted on the main frame of the machine and not on said reciprocable frame 29. The guide rollers 33 have a simple rotatable mounting in said main frame and the driving roller 34 is provided with a shaft 35 on which it is mounted, said shaft having a gear 36 which meshes with an idler pinion 37, said pinion 37 meshing with the gear 21 and thus providing means for driving the roller 34 from the same source of power from which said gear 21 is driven.

Reciprocatory movement is imparted to the frame 29 by an angular link 38 connected to the movable end of a lever 39 pivoted at 40 to the main frame. A cam 41 is fixed to a cam shaft 42 journaled in the main frame and said cam shaft is rotated by a chain 43 passing over suitable sprockets on said cam shaft 42 and one of the conveyor shafts 13 whereby the shaft 42 derives its power from said conveyor shaft and thereby synchronizes the movement of the pan conveyor 11 and reciprocation of the frame 29. A driving bar 44 is pivotally connected at 45 to the lever 39 and lies adjacent the cam 41 having a slot 46 through which the cam shaft 42 passes. Cam rollers 47 are fixed to said bar 44 to engage the periphery of the cam 41 at diametrically opposite positions. Rotation of the cam 41 thereby causes reciprocation of the frame 29 by means of the described members and in the present disclosure such reciprocation is substantially uniform in both directions and throughout each stroke although such uniformity of reciprocation is not essential.

An intermediate endless conveyor belt 48 is arranged beneath the receiving belt 28 having its upper extension in a horizontal plane and passing over a shoe 49 at its delivery return and over a drum 50 at its opposite return, the shoe 49 being fixed to the main frame of the machine and extending transversely thereof and the drum 50 having its shaft 51 journaled in said main frame. The shaft 51 is provided with a sprocket 52 on the outer side of the frame and a chain 53 passes over said sprocket and over a suitable sprocket 54.

The sprocket 54 is rotatably mounted on the side member 1 of the frame and is provided with a pinion (not shown) meshing with a pinion 55 fixed to the outer end of a shaft 56. The shaft 56 is journaled in the main frame and between the side members of said frame the shaft is provided with a pair of arms 57 spaced apart and loosely mounted on said shaft and extending downwardly and toward the delivery end of the machine, the opposite ends of said arms 57 carrying a shaft 58 which is journaled to rotate therein.

The shaft 56 and shaft 58 are each provided with suitable sprockets over which the chain 59 passes and the shaft 58 is also provided with a driving disk 60 the periphery of which disk travels between the friction pulleys 61 and 62. Both of the pulleys 61 and 62 are mounted on the shaft 63, the pulley 61 being fixed to said shaft and the pulley 62 being slidable on said shaft and moved toward the pulley 61 by means of a spring 62a whereby constant frictional engagement occurs between said pulleys and the disk 60. The inner faces of the pulleys 61 and 62 are preferably slightly conical in shape.

The shaft 63 is journaled in the main frame and the said shaft 63 and the main driving shaft 10 are provided with suitable sprockets over which the chain 64 passes whereby rotation is imparted to said shaft 63 from the shaft 10. The arms 57 between their ends are provided with a downwardly extending screw threaded rod 65 entering a screw threaded hand wheel 66 supported by the bracket 67 whereby rotation of said hand wheel will raise or lower the swinging ends of said arms 57 and thereby cause the driving disk 60 to move between the pulleys 61 and 62 relative to the shaft 63 and by such structure the relative speed of rotation between the shaft 63 and the disk 60 may be varied. Such a structure is commonly known as a variable speed friction drive and in itself is well known in the art. By this means it will be seen that the parts above described transmit movement from the main drive shaft 10 to the intermediate conveyor belt 48 and that the speed of movement of said conveyor belt 48 may be varied.

Means for depositing sugar or other substances upon the cookies as they pass through the machine is provided in a roller conveyor with a hopper for such substances located over the conveyor and a feed roller at the hopper to distribute the substance as the cookies are passed under it. The roller conveyor comprises a series of shafts 68 extending transversely of the machine and adjacent the shoe 49 over which the intermediate conveyor belt 48 passes. Each of said shafts 68 is provided with a plurality of spaced apart rollers or disks 69, the disks of one shaft being spaced to lie between the disks of the adjacent shaft and the disks being of diameters to occupy substantially the full space between the shafts.

A waste conveyor belt 70 extends transversely of the machine under the shafts and rollers 68 and 69, passing over drums 71 and 72 and the drum 72 has its shaft provided with a bevel pinion 73 meshing with a bevel pinion 74, said pinion 74 and the drive shaft 10 being provided on the outside of the frame with suitable sprockets over which the chain 75 passes whereby rotation is imparted from said shaft 10 to said drum 72 and the conveyor belt 70 passing over it.

The shafts 68 of the roller conveyor extend outside the frame of the machine and are provided at their outer ends with bevel pinions 76 each of which meshes with one of the plurality of bevel pinions 77 which are mounted on a shaft 78. The shaft 78 is journaled on the frame and said shaft and the shaft of the roller 72 are each provided with sprockets over which a chain 79 passes which drives the shaft 78 and thereby imparts simultaneous rotary movement to all of said shafts 68, all rotating in the same direction which is to move the upper portions of their peripheries toward the delivery end of the machine.

The hopper 80 which contains the sugar or other substance to be deposited on the cookies is located directly over the above described roller conveyor and is supported on the main frame of the machine and its lower end is provided with a feed roller 81 and also with an adjustable gate guide 82. The roller 81 is provided with a shaft 83 at one end of which is a driving disk 84 and a pair of friction pulleys 85 engage the periphery of the disk 84 between them in substantially the same manner as the friction pulleys 61 and 62 engage the disk 60. The pulleys 85 are rotatably mounted on the swinging end of an arm 86, said arm being pivotally mounted on a shaft 87 and the pulleys 85 and shaft 87 are provided with sprockets over which a chain 88 passes. The shaft 87 and the outer end of the shaft 63 are provided with other sprockets over which the chain 89 passes.

A screw threaded rod 90 passes through or adjacent the arm 86 between its ends and is connected to a fixed part of the frame and is provided with a screw threaded hand wheel which engages said arm, which construction provides means for moving the friction pulleys 85 to various positions relative to the periphery of the disk 84. By this structure the shaft 63, previously described, drives the friction pulleys 85 through the chains 89 and 88 and the pulleys in frictional engagement with the disk 84 rotate said disk and consequently the feed drum 81. The variable speed friction drive herein described is substantially the same as the analogous structure having the parts 57, 60, 61, 62 and 63 and forms no specific part of the present invention.

The surface of the feed drum 81 may be treated as desired, either smooth or corrugated or with deep or shallow grooves or recesses depending upon the material to be fed and the size of the particles of which it is composed. The amount of material fed by rotation of the drum from the hopper 80 may be governed by adjustment of the gate 82, the lower edge of which may be moved relative to the periphery of the feed drum.

A delivery conveyor belt 92 extends from the delivery side of the roller conveyors toward the delivery end of the machine and downwardly into close proximity with the pan conveyor 11, said belt passing over a roller 93 near said roller conveyor and over a shoe 94 near said pan conveyors. The belt also passes around a driving drum 95 which is mounted on the shaft 87, previously described, and is driven by the chain 89 and frictional engagement between said belt and drum causes movement of the upper portion of the belt in a direction toward the delivery end of the machine.

A presser roller 96 is located over the delivery belt and preferably substantially over the drum 95, being spaced above the belt substantially the desired thickness of a cookie for the purpose of engaging any large particles which may be deposited on the cookie and depressing them into the body thereof. If desired the roller 96 may be mounted for vertical adjustment so that the space between it and the belt 92 may be varied.

As this machine has been constructed it is desired that the cookies formed by one rotation of the die roller 16 shall constitute a panful and inasmuch as the pans 97 are considerably longer than the circumference of the roller the movement of the pan conveyor 11 must be more rapid than the peripheral speed of the die roller. The pan conveyor 11 is provided with lugs 11a extending upwardly therefrom at spaced apart locations, the spaces between said lugs being somewhat greater than the length of a pan 97 and in operation a pan is placed upon the conveyor between two of the lugs and carried forward by engagement with the rear lug. The pan conveyor 11 moves at a speed whereby the distance between centers of the lugs 11a will pass through the machine in unison with one rotation of the die roller 16.

It is preferred to have the receiving conveyor belt 28 move at the same speed as the peripheral speed of the die roller 16. The speed of movement of the intermediate conveyor belt 48 is variable as has been explained but it is not advantageous to permit it to move slower than the movement of the receiving belt 28. Speed of movement of the roller conveyor and the delivery conveyor is optional to a certain extent but it is desired that their movement be the same or approximately the same as the speed of the pan conveyor 11.

It will be understood that the relative speeds above described may be varied to some extent without altering the principle of operation. The relation between movements of the die roller and the pan conveyor could be varied with the result that more or less cookies would be deposited upon each pan. The speed of movement of the receiving conveyor might be varied with little or no change in the ultimate result. Likewise the relative speeds of the roller conveyor and the delivery conveyor is substantially immaterial. It is the variable speed of the belt 48 which is the gist of the present invention.

*Operation*

It will be understood that the principal object of the invention is to separate the cookies which are formed by the die roller 16 in evenly spaced relation, into groups with gaps between groups and also to vary the spacing of the cookies in the groups and likewise the gaps between groups. It is also required, however, to deposit the cookies formed by one rotation of the die roller 16 in a space equal to the distance between centers of the lugs 11a on the pan conveyor 11 and the combined length of a group of cookies and a gap between them must always equal said distance although the relation between the length of the group of cookies and the gap may be varied.

The machine in its operation forms the cookies in the conventional manner by pressing the dough contained in the hopper 24 into the recesses of the die roller 16 as it rotates, the presser roller 18 serving the purpose of pressing the dough into said die recesses and the stripper knife 25 acting to remove superfluous dough from the surface of the die roller which dough clings to the presser roller 18 and is carried back into the hopper to be used over. As the die roller 16 rotates the wire belts 27 causes the cookies to remove from the die recesses and to drop upon the receiving belt 28 which passes beneath the die roller and, as has been described, the receiving belt travels at approximately the same speed as the peripheral speed of the die roller.

The opposite returns of the receiving belt pass over the roller 32 and the shoe 31, respectively, which are mounted on the reciprocating frame 29 whereby the depositing position of the forward edge of the belt varies from one extreme to the other of the reciprocating motion of said frame but such motion is restricted so that the passage of the belt under the die roller is never interrupted and therefore the belt in this position moves continuously at a uniform speed and permits continuous deposit of cookies from the die roller in evenly spaced relation.

The frame 29 is timed to complete a reciprocation, that is, a movement in each direction, during each cycle of operation of the machine, which cycle also includes one rotation of the die roller 16 and movement of the pan conveyor a distance equal to the distance between centers of the lugs 11a thereon. The movement of the frame 29 in the forward direction is arranged to be at the same speed as movement of the receiving belt 28 and consequently when the shoe 31 is moved forwardly said shoe simply keeps pace with the movement of the belt and advances the depositing edge at that speed so that cookies upon the belt are not deposited during such forward movement. Return reciprocation of the frame and shoe 31 moves the depositing edge of the belt rearwardly which, together with continued movement of the belt, causes a rapid deposit of cookies therefrom and such movement is arranged to deposit the cookies formed by one rotation of the die roller which is also a panful.

The cookies deposited from the receiving belt fall upon the intermediate belt directly below it and said intermediate belt is also moving but at a chosen speed as its speed may be varied as previously set forth. If we assume that the intermediate belt moves at the same speed as the receiving belt then the cookies will be deposited thereon with no change of position than they were on the receiving belt because the two belts keep pace with each other and also with the forward reciprocation of the shoe 31 which causes the first cookies to be deposited upon return reciprocation of the shoe directly behind the last cookies which were previously deposited on the intermediate belt.

However, when the intermediate belt moves faster than the receiving belt, and also faster than the forward reciprocation of the shoe 31, then a gap will be formed between the last cookies deposited on the intermediate belt and the first cookies deposited by the next rearward reciprocation of the shoe 31. For example and referring to Figs. 3, 4, 5 and 6, Fig. 3 shows the frame 29 carrying the shoe 31, moving rearwardly and in the act of depositing cookies on the intermediate belt. This rearward reciprocation continues until a panful of cookies has been deposited, which, in the drawing, is 8 in number. Then the frame and shoe begin the forward movement, such forward movement being at the same speed as the travel of the receiving belt, so that the movement of the depositing edge of the receiving belt prevents cookies from being deposited but such forward movement is slower than the corresponding movement of the intermediate belt and the more rapid movement of the intermediate belt carries the cookies which have previously been deposited forward and away from the shoe 31 and the depositing edge of the receiving belt, providing a gap and therefore when the rearward movement of the shoe 31 begins and the cookies are deposited from the receiving belt onto the intermediate belt the next group or panful is deposited with a gap between it and the previously deposited group.

Increase of speed of the intermediate belt relative to the receiving belt will increase the gap between groups of cookies and likewise will increase the spacing of the cookies in the groups. As the parts are arranged in this machine the increased speed of the intermediate belt will provide half of the distance of travel of its increased speed for a gap between groups and the other half of such distance will be added to the spacing in the group. However, because of the unchanging factor of the original length of the group of cookies, alteration of the distances provided for gap and added to the group will result in a variation of ratios between group and gap.

As an example, if the receiving belt travels four feet in a cycle to deposit a group or panful of cookies and the intermediate belt travels one foot faster in the cycle, then six inches of such additional travel will be provided for a gap between groups and six inches will be added to the spacing in the group making a total length of group four feet and six inches and a gap of six inches which is a ratio of one to nine. However, if the receiving belt travels at the same speed, of four feet per cycle and the intermediate belt travels two faster per cycle then the gap will be one foot and with one foot added to the original length of the group making it five feet, the ratio is one to five. These ratios may be varied from a minimum where the two belts run at the same speed and there is no change in relation between the cookies and the maximum increased speed of the intermediate belt where the gap between groups is extremely large relative to the length of the group itself.

The length of a group of cookies and its accompanying gap is definitely fixed by the speed of movement of the pan conveyor which, as previously described, must be such as to move a pan and its accompanying gap through the machine during one cycle of operations or during the time that a panful of cookies is deposited and the gap between panfuls or groups is made. Therefore the positioning of the cookies on the intermediate belt does not necessarily indicate that the same position will maintain when the cookies are finally deposited on the pans on the pan conveyor. The position of the cookies on the intermediate belt governs the ratio of the distances between the cookies in the groups and the gap between groups but the actual dimensions of such spaces and gap may be varied, though in the same ratio, when the cookies are moved onto the pans.

For example, if the intermediate belt be moved slower than the pans then the distances in the group and between groups will be increased when the cookies are finally deposited and the reverse change of distances would occur if the intermediate belt were moving faster than the pans. Therefore an extremely close spacing of the cookies in the groups and inversely corresponding long gap between groups may be provided by running the intermediate belt considerably faster than the movement of the pans and when the cookies are deposited from the receiving belts onto the pans the same ratio of distances will maintain but the actual distances will be reduced.

The roller conveyor and depositing conveyor have no effect upon changing the relative positions of the cookies but in this device merely act as supplementary conveyors to carry the cookies from the intermediate variable speed conveyor through the sugar depositing device and under the presser roller and to deposit them on the pan. The device would actuate with exactly the same result, insofar as arrangement of the cookies was concerned, if the intermediate conveyor 48 were arranged to deposit the cookies directly onto the pans.

It may also be here explained that the variable speed intermediate belt might be dispensed with and the cookies deposited directly from the reciprocating edge of the receiving belt onto the pans. In such an arrangement, and provided that the pans moved faster than the receiving belt, the cookies would be deposited in groups with gaps between them exactly as above described in depositing on the intermediate belt moving faster than the receiving belt. Such an arrangement, however, would preclude the possibility of varying the relation of distances between groups and gaps because of the necessity of moving the pan conveyor at a uniform speed relative to the receiving belt so that one pan will pass through the machine during each cycle of operation to receive a panful of cookies.

The sugar depositing hopper 80 located directly over the roller conveyor deposits sugar or other substances upon the cookies as they pass under it by rotation of the said roller 81. The surface of said roller may be smooth or may have corrugations or other depressions as is desirable depending upon the consistency of the material to be fed. The speed of its rotation may be varied by the variable speed drive previously described and having the parts 84, 85, 86, etc. The specific roller conveyor of this invention is exceptionally advantageous for this particular use because it provides the large number of closely arranged contacts to support and move the cookies which are in the nature of soft dough but at the same time it is a relatively open structure which permits surplus material to readily fall through the conveyor and drop upon the waste belt 70 which moves beneath it and such material may be deposited from the waste belt into a container from where it may be replaced in the hopper and used over again.

The presser roller 96 insures a substantially uniform thickness of cookies which pass over it and it is especially useful to embed large particles, such as nut meats, deposited on the surface of the cookies so that they will be substantially flush with the surface of the cookies. The roller conveyor and the delivery conveyor are arranged to move at substantially the same speed as the pans and the pan conveyor although the relation between the speeds of the two conveyors and the pan is not important to the functioning of the machine.

From the foregoing description it will be seen that this machine provides means by which cookies may be formed in any suitable manner and deposited in uniformly spaced relation and by which such cookies may be rearranged into groups with gaps between them and deposited upon pans carried by a continuously and uniformly moving conveyor whereby each group of cookies may be deposited squarely within the boundaries of the pan and the gaps between the groups will be synchronized with the gaps between the pans.

Furthermore the arrangement of the cookies in the groups may be varied at will from one extreme to another in which the cookies may be arranged practically adjacent each other in the groups with wide gaps between groups or they may be laid with relatively wide spaces between groups and such variation is accomplished by merely turning the hand wheel 66 which has the result of driving the intermediate conveyor 48 faster or slower as previously described.

The machine also provides a convenient mechanism for depositing substances upon the surface of the cookies and for depositing of the surplus substance without clogging the parts of the machine and in a manner whereby such surplus substance may be replaced in the said hopper and not wasted and the presser roller maintains substantial uniformity of thickness under all conditions and the conveyors forming a part of said coating device and said pressing device also serving as means for delivering the cookies from the intermediate conveyor 48 to the cookie pans.

It is conceived that the mechanism of this invention which receives the cookies and acts to rearrange their spacing may be utilized without such parts as the cookie forming mechanism, the device for depositing coating material and the presser roller and in such uses it may operate upon other articles than cookies. In fact, the essence of the invention relates broadly to means for rearranging articles without respect to cookies specifically.

We claim:

1. In a device of the class described, a continuously moving first receiving conveyor, reciprocating means to change the position of the delivery edge of said first receiving conveyor, a continuously and uniformly moving pan conveyor, means for locating pans upon said pan conveyor properly arranged whereby movement through the device of each of said pan locating means will be synchronized with a complete reciprocation of said delivery edge changing means, a uniform speed conveyor for transferring said articles from said first receiving conveyor to pans on said pan conveyor and means for changing the speed of the last named conveyor.

2. In a device of the class described, a continuously moving first receiving conveyor, reciprocating means to change the position of the delivery edge of said first receiving conveyor, a continuously and uniformly moving pan conveyor having movement faster than that of the first receiving conveyor, means for locating pans upon said pan conveyor properly arranged whereby movement through the device of each of said pan locating means will be synchronized with a complete reciprocation of said delivery edge changing means, a uniform speed conveyor for transferring said articles from said first receiving conveyor to pans on said pan conveyor and means for varying the speed of the last named conveyor.

3. In a machine of the class described, a uniformly moving first receiving conveyor to receive articles in spaced relation, a reciprocating means for changing the position of the delivery edge of said first receiving conveyor, a uniformly moving final receiving conveyor, a uniformly moving transfer conveyor to receive articles from the delivery edge of the first receiving conveyor and to deposit them upon the final receiving conveyor, said transfer receiving conveyor having a fixed position delivery edge, and means for varying the speed of movement of the transfer conveyor.

4. In a device of the class described, a continuously moving first receiving conveyor, reciprocating means to change the position of the delivery edge of said first receiving conveyor, a continuously and uniformly moving pan conveyor having movement faster than that of the first receiving conveyor, means for locating pans upon said pan conveyor properly arranged whereby movement through the device of each of said pan locating means will be synchronized with a complete reciprocation of said delivery edge changing means and constant speed means for transferring said articles from said first receiving conveyor to pans on said pan conveyor, said constant speed means having a stationary delivery edge.

FRANK CHARLES WERNER.
HAROLD O. VAN ANTWERP.